(12) United States Patent  (10) Patent No.: US 8,740,433 B2
Smith  (45) Date of Patent: Jun. 3, 2014

(54) FRAME-SUPPORTED VEHICLE WITH FRAME FORMING LEAKY LIGHT PIPE

(75) Inventor: Forrest Smith, Santa Ana, CA (US)

(73) Assignee: Phantom Frames, Inc., Santa Ana, CA (US)

(*) Notice: Subject to any disclaimer, the term of this patent is extended or adjusted under 35 U.S.C. 154(b) by 260 days.

(21) Appl. No.: 13/096,241

(22) Filed: Apr. 28, 2011

(65) Prior Publication Data

US 2012/0275179 A1 Nov. 1, 2012

(51) Int. Cl.
*F21V 7/04* (2006.01)
*H01L 33/00* (2010.01)

(52) U.S. Cl.
USPC ........... 362/555; 362/551; 362/552; 362/556; 362/554

(58) Field of Classification Search
None
See application file for complete search history.

(56) References Cited

U.S. PATENT DOCUMENTS

| | | | |
|---|---|---|---|
| 4,901,209 | A | 2/1990 | Nitz |
| 5,008,782 | A | 4/1991 | Murray |
| 5,823,653 | A | 10/1998 | Elam et al. |
| 5,902,038 | A | 5/1999 | Curry |
| 6,779,913 | B2 | 8/2004 | Niezrecki |
| 2009/0080207 | A1 | 3/2009 | Hurwitz |

*Primary Examiner* — Natalie Walford
(74) *Attorney, Agent, or Firm* — Laubscher & Laubscher, PC

(57) ABSTRACT

A frame-supported vehicle, such as a bicycle or the like, has at least one frame component made of a light diffusing or fluorescent translucent or transparent material to form a leaky light pipe, and at least one light source in light communication with the frame component, whereby light propagates within the frame and is visible from outside the frame by diffusion or fluorescence or a combination thereof. The bicycle is highly visible at night, and may carry logos or other indicia that are enhanced by the background illumination, which may be redirected out of the tube.

24 Claims, 5 Drawing Sheets

FRAME-SUPPORTED VEHICLE WITH FRAME FORMING LEAKY LIGHT PIPE

FIELD OF THE INVENTION

This invention relates to frame-supported vehicles with high visibility. Such frame-supported vehicles include bi-cycles, tri-cycles, scooters and other like vehicles.

BACKGROUND OF THE INVENTION

When riding a bicycle or like vehicle in conditions of low light or diminished visibility, it is desirable to increase ability for other vehicles and pedestrians to detect the bicycle and hence protect the rider from accidental impact. Currently there exist a variety of aftermarket lighting systems designed to project light away from the bike.

Current lighting systems on the market generate narrow light beams projected or reflected away from the bicycle. These options are directional in nature and have limited ability to increase the rider's visibility. The light is projected away from the bike, rather than illuminating the bicycle itself.

U.S. Pat. Nos. 5,823,653 and 6,779,913 disclose lights that are affixed to the bicycle frame. US patent application no. 2009/0080207 discloses the use of lights that can be incorporated within a translucent frame.

In these systems, however, the light sources are visible through the translucent frame, and do not give an even illumination.

SUMMARY OF THE INVENTION

According to the present invention there is provided frame-supported vehicle comprising at least one frame component made of a material forming a leaky light pipe, and at least one light source for launching light into the leaky light pipe, whereby the light from the light source propagates within the light pipe and is externally visible. The term externally visible means that the light is visible by an observer at a distance from the bicycle. The light itself of course propagates internally within the bicycle frame.

In one embodiment the frame-supported vehicle is a bicycle, but it may also be a tri-cycle, scooter, and other like vehicle that is based on a frame structure.

Light propagates within the light pipe, but unlike an optical fiber, for example, the light pipe is deliberately designed to be "leaky" so that the light propagating within it is externally visible. It will be understood that the light pipe can be in the form of a tube or a rigid rod.

Thus, in accordance with an embodiment of the present invention the bicycle frame, or part thereof, is made of a transparent or translucent light diffusing material illuminated by a source located at one or both ends and arranged such that light propagates within the walls of the frame and is diffused by the material over a wide area.

The invention actually causes the bicycle, to become illuminated, rather than simply projecting light away from the bicycle and rider.

Embodiments of the present invention generally take the form of a molded or fabricated bicycle frame manufactured from transparent or translucent polymers. The frame is then fitted with a series of lighting elements, which project light into the end of the frame structure such that it propagates along the wall of the frame. Due to the light transmission capability of the frame materials, all the major frame sections can be illuminated in this method so that the major part of the bicycle becomes luminescent.

The frame structure propagates the light along its length within the material of the structure, which can be in the form of a rod or tube.

In another aspect the invention comprises a frame structure for a frame-supported vehicle comprising at least one rod or tube made of a material forming a leaky light pipe, and at least one light source for launching light into the leaky light pipe, whereby the light from the light source propagates within the light pipe and is externally visible.

The frame structure may be molded as an integral unit.

BRIEF DESCRIPTION OF THE DRAWINGS

The invention will now be described in more detail, by way of example only, with reference to the accompanying drawings, in which.

DETAILED DESCRIPTION OF THE INVENTION

Figure 1:
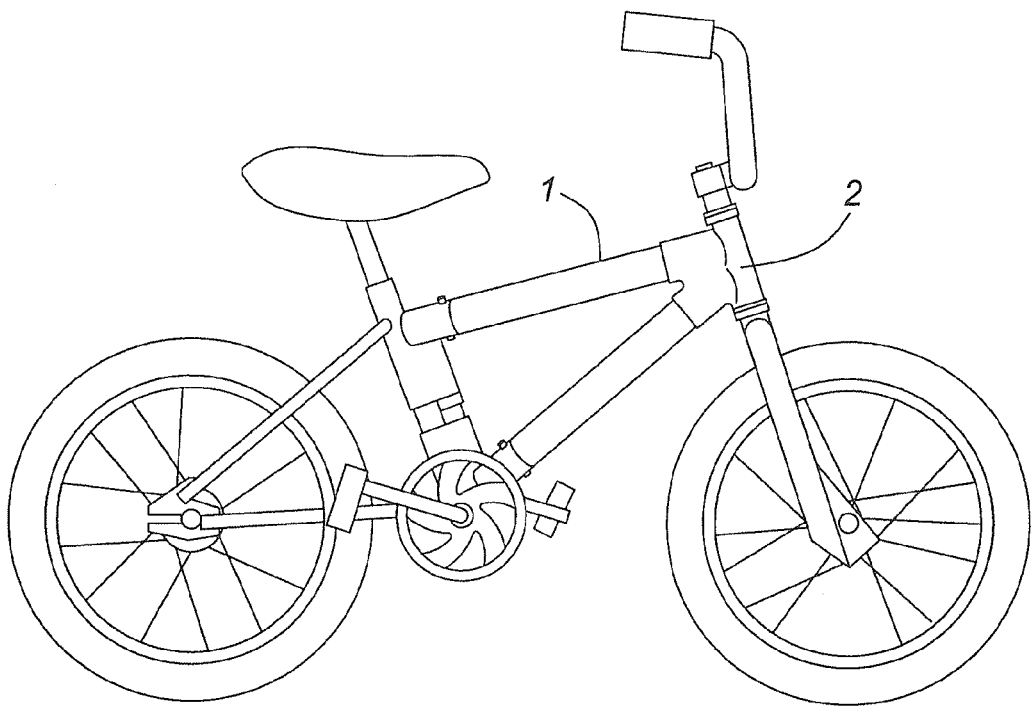
FIG. 1 is a side elevation including an illuminate system in accordance with one embodiment of the invention.

FIG. 1 shows a prototype that has been constructed using fabricated sections of rod, which are joined by steel intersection points taken from a commercial bike frame. Major frame components 1 and 2 have been replaced by polycarbonate rods. Each polycarbonate rod forms a light pipe with LED lighting elements (not shown in FIG. 1) mounted at each end for launching light into the light pipe.

Figure 2:
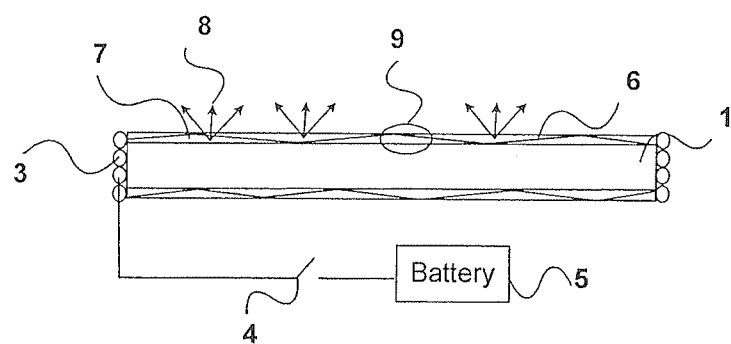
FIG. 2 is a diagrammatic side view of a frame component with a solid light pipe.
Figure 3:
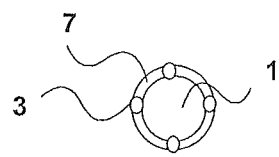
FIG. 3 is an end view of the frame component.

The lighting elements are designated 3 in FIG. 2, which shows a frame component 1 made of a solid rod as employed in FIG. 1, with the lighting elements mounted at each end. The lighting elements 3 are set in recesses 3a in the ends of the solid rod.

The lighting elements 3 are powered either via battery 5 or bicycle tire generator (not shown). A switch 4 can be provided for turning the lighting elements on and off. This can be mounted on the handlebars if desired. In the embodiment shown in FIG. 1, there are four lighting elements and four switches, one at each end of each rod, but of course it will be appreciated that the lighting elements can be connected to a common switch.

The light elements can conveniently be recessed into cavities at the end of the frame components.

As shown in FIG. 2, light rays 6 propagate within the solid light pipe partly by total internal reflection, in much the same manner as an optical fiber, except unlike an optical fiber the light pipe is designed to be leaky so that light rays 8 leak out of the rod in part due to the diffusive properties of the material. Also, because of the large diameter of the rod as compared to an optical fiber, not all the rays will strike the walls at an angle above the critical angle, and these rays, such as ray 13, will also leak out due to refraction at the frame air interface. This gives the frame component illuminated at one end a luminescent appearance similar to a toy lightsaber. Such a structure can be generally considered as a leaky light pipe.

The diffusion properties can be enhanced if necessary by including small beads of glass or other polymer of different refractive index, for example nanoparticles, in the frame members to increase the light diffusing properties of the material.

Figure 4:
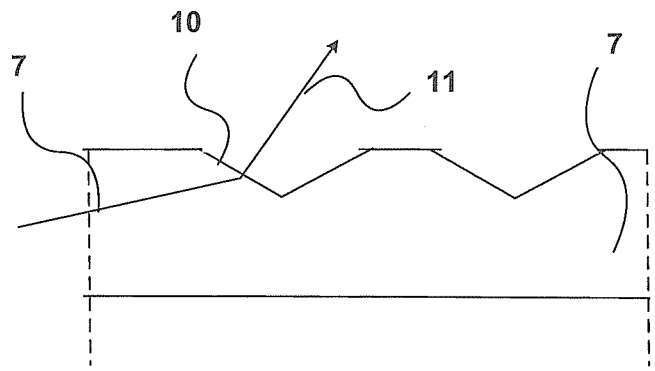
FIG. 4 shows a detail of FIG. 2.

The frame components 1, 2 can be manufactured with various textures and etchings 9, shown in more detail in FIG. 4. These etchings have facets 10 which will refract the light out and illuminate the bicycle in various decorative designs. As the light strikes the facets, light that would otherwise be above the critical angle will be at an angle of incidence less than the critical angle for total internal reflection and thus emerge through the facet. This effect will give the facet, and hence the associated etching or engraving, the appearance of being illuminated against the background of the luminescent frame. The rays that would have struck the walls below the critical angle will also of course still be refracted out.

The frame components 1, 2, can be made from similar polymeric or other materials to polycarbonate that have light diffusing properties. They can be in the form of hollow tubes or solid rods.

Figure 5:
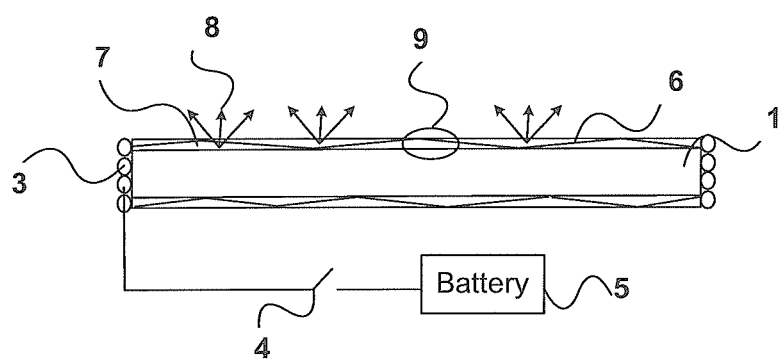
FIG. 5 shows an embodiment where the frame component is in the form of a hollow tube.
Figure 6:
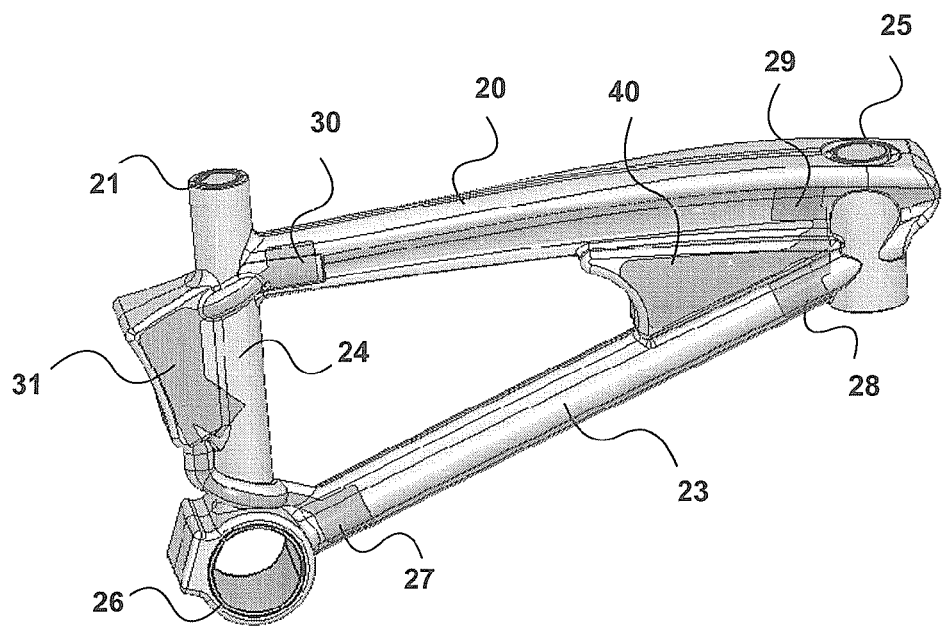
FIG. 6 is a perspective view of a molded unitary frame in accordance with an embodiment of the invention.
Figure 7:
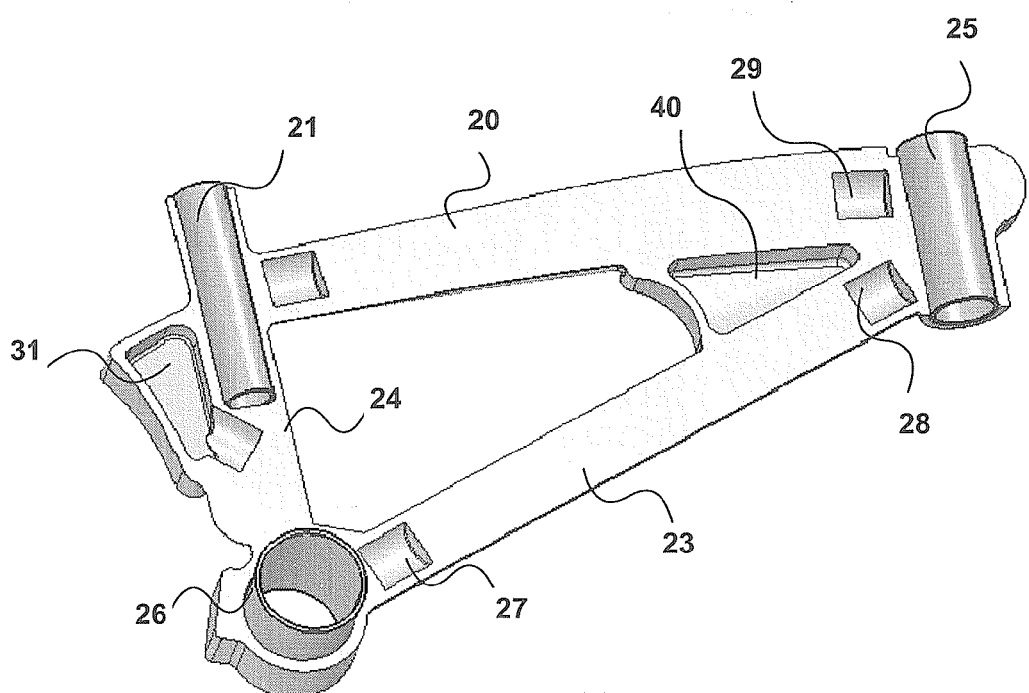
FIG. 7 is a sectional view of the molded frame.
Figure 8A:
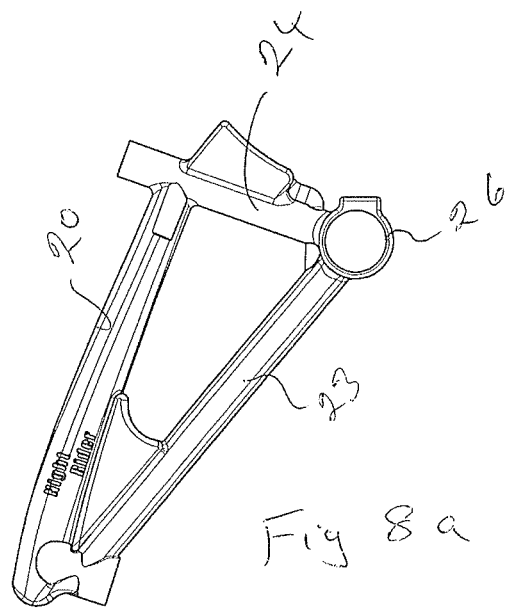
FIGS. 8a to 8d show respectively a side view, bottom view top view and sectional view of the frame.
Figure 8B:
Figures 8C, 8D:
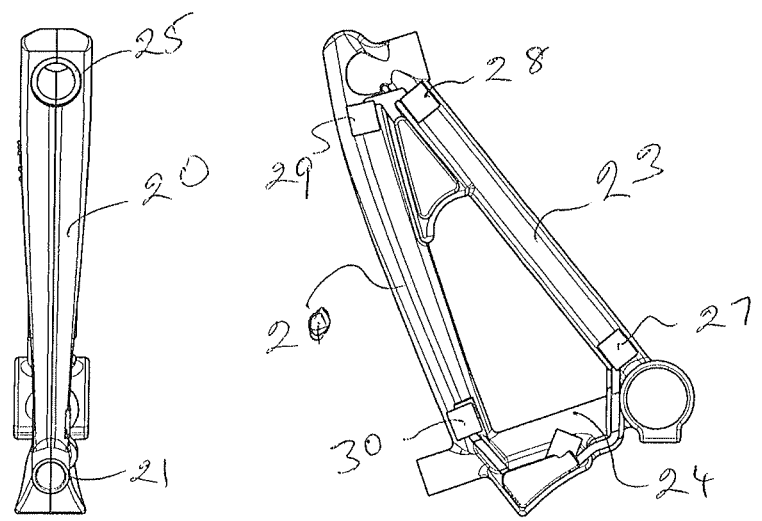

FIG. 5 shows an embodiment where the frame component is in the form of a hollow tube. In this case, the light will propagate within the walls of the tube, and as more rays will strike the boundary at an angle above the critical angle, less light will leak than in the case of the rigid rod shown in FIG. 2. While the light sources are typically LEDs, other sources could be used if desired.

Also, while the light sources are preferably installed at the ends of the structures, they could also be installed at other locations where the light will be launched directly into the frame components for propagation along their length. However, the light sources will not normally be externally visible along the entire length of the frame component.

Thus, in accordance with embodiments of the invention, light from these sources is directed into the tubes, diffusing along its path to light the entire frame section.

It is also possible to include fluorescent material within the molded frame to enhance the luminescent effect. One possibility would be to use UV LEDs with fluorescent material mixed embedded or mixed with the polycarbonate frame.

The embodiment shown in FIGS. 6, 7 and 8a-8d comprises a molded polycarbonate frame member having the major sections 20, 23, and 24 made in one piece. The sections 20 and 23 can be solid, whereas the section 24 can have a hollow end to receive a supporting post of a saddle. The forward section of the frame member has a vertical bore receiving a steel bushing 25 for the front frame member supporting the front wheel. The rear junction of the sections 23, 24 has a bore receiving a steel bushing 26 for the receiving the bicycle cranks.

LED lighting elements 27, 28, 29, 30 are recessed into the ends of the frame members 20, 23, causing these members to become luminescent as explained with reference to FIG. 2. The LED lighting elements can be in the form of an array of LEDs, or a single high intensity LED.

A battery is inserted in recess 31 with a snap fit cover. A switch can be provided (not shown). This battery can power the rear end lights 27, 30. Likewise a battery can be fitted into recess 40 in the rear end of the frame also fitted with a snap cover to power the front end LEDs 28, 29. The recesses can be closed by covers once the components have been installed. The wiring can be external or incorporated into channels in the frame members during the molding process. As the current is very small, only very fine wires are required, although in one example ¼" channels were provided to accommodate the wires.

For marketing purposes, patterns can be engraved into the frame sections including sports team logos, corporate logos, cartoon characters, skulls, and the like for marketing purposes. These will then appear bright, being illuminated by refracting the internal light that is transmitted along the frame members.

Unlike the prior art systems, the light sources need not be visible, yet the illuminated frame has a luminescent quality that makes it highly visible.

The invention claimed is:

1. A frame-supported vehicle comprising at least one frame component made of a material with light diffusing properties forming a leaky light pipe, and at least one light source for launching light into the leaky light pipe, and wherein the light source is disposed such that the light therefrom propagates internally away from said at least one light source axially along the light pipe and is externally visible off axis, at least in part due to the light diffusing properties of the material, as the light propagates internally within the light pipe.

2. A frame-supported vehicle as claimed in claim 1, wherein the at least one light source comprises an LED.

3. A frame-supported vehicle as claimed in claim 2, wherein the at least one external light source is mounted at the end of the light pipe.

4. A frame-supported vehicle as claimed in claim 2, wherein the at least one external light source is mounted at both ends of the frame component.

5. A frame-supported vehicle as claimed in claim 1, wherein the frame component is made of a polymeric light diffusing material.

6. A frame-suppported vehicle as claimed in claim 5, wherein the polymeric material contains beads or particles to enhance the light diffusing properties.

7. A frame-supported vehicle as claimed in claim 5, wherein the polymeric material has fluorescent properties.

8. A frame-supported vehicle as claimed in claim 1, wherein the frame component is etched or engraved to form indicia that become illuminated by light refracted from within the frame component.

9. A frame-supported vehicle as claimed in claim 1, wherein the frame component is a rod.

10. A frame-supported vehicle as claimed in claim 1, wherein the frame component is a tube.

11. A frame-supported vehicle as claimed in claim 1, comprising a unitary molded unitary frame incorporating at least one said frame component.

12. A frame-supported vehicle as claimed in claim 11, wherein the light elements are recessed into the ends of the frame components.

13. A frame-supported vehicle as claimed in claim 11, wherein the unitary molded frame is made of polycarbonate.

14. A frame-supported vehicle as claimed in claim 1, which is a bicycle.

15. A frame structure for a frame-supported vehicle comprising at least one rod or tube made of a material with light diffusing properties forming a leaky light pipe, and at least one light source for launching light into the leaky light pipe, and wherein the light source is disposed such that the light therefrom propagates internally away from said at least one light source axially along the light pipe and is externally visible off axis, at least in part due to the light diffusing properties of the material, as the light propagates within the light pipe.

16. A frame structure as claimed in claim 15, wherein at least one light source comprises an LED.

17. A frame structure as claimed in claim 15, wherein the at least one light source is mounted at one end of the rod or tube.

18. A frame structure as claimed in claim 15, wherein the at least one light source is mounted at both ends of the rod or tube.

19. A frame structure as claimed in claim 15, wherein the material is a polymeric light diffusing material.

20. A frame structure as claimed in claim 19, wherein the polymeric material contains beads or particles to enhance its light diffusing properties.

21. A frame structure as claimed in claim 19, wherein the polymeric material is polycarbonate.

22. A frame structure as claimed in claim 21, wherein the rod or tube is etched or engraved to form indicia that become illuminated by refracting the light propagated along the frame component.

23. A frame structure as claimed in claim 15, wherein the at least one light source is recessed into at least one end of the rod or tube.

24. A frame structure as claimed in claim 15, wherein the frame structure comprises several frame sections molded as an integral unit, at least one of which forms said at least one rod or tube.

\* \* \* \* \*